(12) United States Patent
Potschin et al.

(10) Patent No.: US 7,090,151 B2
(45) Date of Patent: Aug. 15, 2006

(54) CONTROL ELEMENT FOR INJECTORS WITH SWITCHABLE NOZZLE NEEDLE

(75) Inventors: Roger Potschin, Brackenheim (DE); Peter Grabandt, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 247 days.

(21) Appl. No.: 10/475,789

(22) PCT Filed: Nov. 29, 2002

(86) PCT No.: PCT/DE02/04387

§ 371 (c)(1),
(2), (4) Date: Mar. 29, 2004

(87) PCT Pub. No.: WO03/058052

PCT Pub. Date: Jul. 17, 2003

(65) Prior Publication Data

US 2004/0149838 A1 Aug. 5, 2004

(30) Foreign Application Priority Data

Jan. 9, 2002 (DE) ............................... 102 00 531

(51) Int. Cl.
*B05B 1/30* (2006.01)
*F02M 59/00* (2006.01)
*F02M 39/00* (2006.01)
*F02M 47/02* (2006.01)

(52) U.S. Cl. ............................... 239/533.2; 239/533.1; 239/533.3; 239/533.9; 239/585.5; 239/88

(58) Field of Classification Search ............ 239/533.2, 239/533.1, 533.3, 533.9, 585.1, 585.3, 585.4, 239/585.5, 88–93; 251/129.15, 129.4, 127
See application file for complete search history.

(56) References Cited

U.S. PATENT DOCUMENTS

| 4,409,939 A | * | 10/1983 | Eheim et al. | ................ 123/357 |
| 4,603,671 A | | 8/1986 | Yoshinaga et al. | |
| 4,637,433 A | * | 1/1987 | Stoll | ...................... 137/625.65 |
| 5,979,790 A | | 11/1999 | Gurich et al. | |
| 6,055,950 A | * | 5/2000 | Schafer et al. | ........... 123/90.17 |

FOREIGN PATENT DOCUMENTS

| DE | 42 36 882 C1 | 4/1994 |
| DE | 195 33 786 A1 | 3/1997 |
| DE | 297 08 369 U1 | 7/1997 |
| DE | 198 37 890 A1 | 2/2000 |

(Continued)

*Primary Examiner*—Davis Hwu
(74) *Attorney, Agent, or Firm*—Ronald E. Greigg

(57) ABSTRACT

The invention relates to a device for actuating a control piston or nozzle needle (27) via a control chamber (26). The control chamber communicates via a control chamber line (25) with valve chambers (3, 22) of a 3/2-way valve (5). The valve body (6, 40, 51) of this valve is switchable by means of an actuator (11). By means of a restoring spring (14), the valve body (6, 40, 51) is acted upon such that a seat portion (7), embodied in the housing (4) on the valve body (6, 40, 51), is put into its valve seat (20). The valve body (6, 40, 51) of the 3/2-way valve (5) has a seat portion (7) and a longitudinal slide portion (8), as well as hydraulic faces (31,32), facing one another, that make the state of pressure equilibrium of the valve body (6, 40, 51) possible. The valve body (6, 40, 51) is moved to different stroke lengths (10; 23, 24) by means of an actuator (11).

11 Claims, 3 Drawing Sheets

FOREIGN PATENT DOCUMENTS

| | | |
|---|---|---|
| DE | 199 39 447 A1 | 11/2000 |
| DE | 100 64 790 A1 | 6/2001 |
| GB | 2 305 217 A | 4/1997 |
| WO | WO 95/25888 | 9/1995 |

* cited by examiner

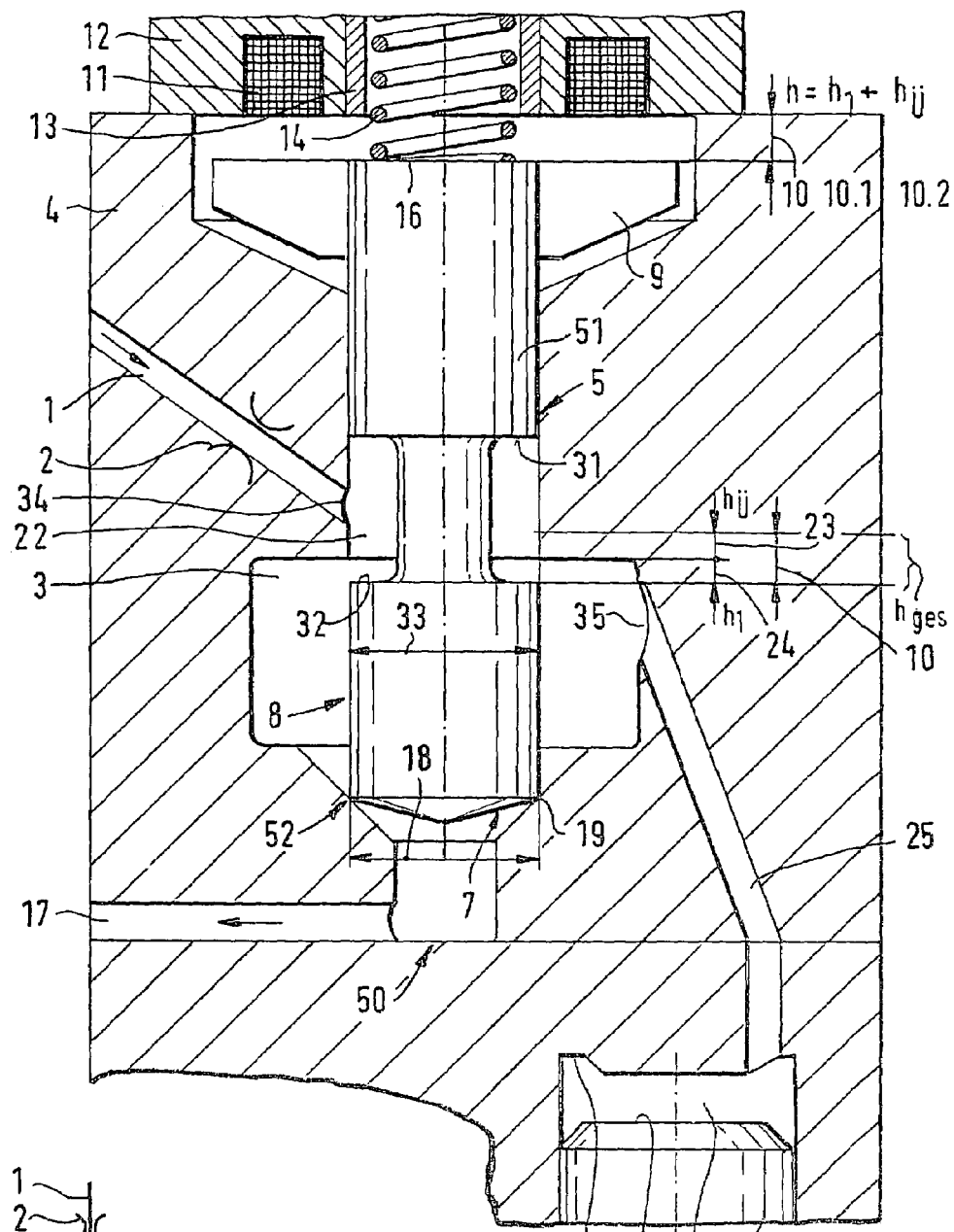
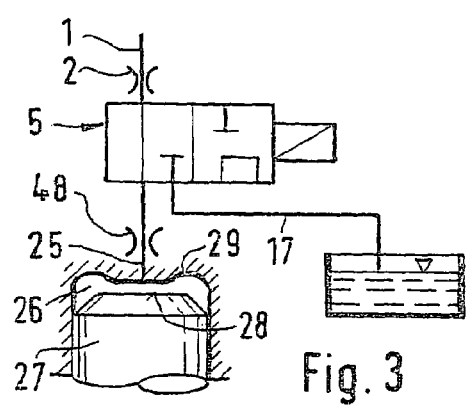
Fig. 3
Fig. 4

CONTROL ELEMENT FOR INJECTORS WITH SWITCHABLE NOZZLE NEEDLE

CROSS-REFERENCE TO RELATED APPLICATIONS

This application is a 35 USC 371 application of PCT/DE 02/04387 filed on Nov. 29, 2002.

BACKGROUND OF THE INVENTION

1. Field of the Invention

In air-compressing internal combustion engines, fuel injection systems are increasingly being used that for instance include injectors that are supplied with fuel via a high-pressure collection chamber (common rail), or injectors with pressure boosters or unit fuel injector systems. The fuel injection systems listed predominantly include 2/2-way valves, which as a rule are not in a state of pressure equilibrium.

2. Prior Art

European Patent Disclosure EP 0 987 431 A2 has a fuel injector for internal combustion engines as its subject. The fuel injector includes a nozzle needle, which is vertically movably received inside a bore in the injector housing. One face of the nozzle needle partly defines a control chamber, which communicates with a supply line via a restriction. By means of a control valve, the communication between the control chamber and a low-pressure region is controlled. There is also a valve for communication between the supply line and the low-pressure region. This valve and the control valve each include armature elements, which are actuatable by means of an electromagnetic actuator that is common to both valves.

European Patent Disclosure EP 1 081 373 A2 likewise has a fuel injector as its subject. It is used in an arrangement that includes a fuel pump, a pump chamber, and a first valve; this first valve controls the communication between the pump chamber and a low-pressure region. The injector includes a nozzle needle, which can be brought into interaction with a needle seat. A control chamber is disposed such that the fluid pressure prevailing in it presses the nozzle needle into its needle seat. The fluid pressure inside the control chamber is controlled by means of a control valve. The control valve in turn is controlled via an actuating assembly in such a way that when the actuating assembly is not activated, the control valve opens a fluid communication between the control chamber and the low-pressure region.

In the version of EP 1 081 373 A2, 2/2-way valves are used on the outlet side relative to a control chamber. The use of such 2/2-way valves on the inlet side of a control chamber, which acts upon a control piston that indirectly actuates the nozzle needle, is unfavorable because of the high actuation forces required.

SUMMARY OF THE INVENTION

The valve proposed according to the invention furnishes a pressure-balanced 3/2-way valve, which requires only slight actuating forces compared to the versions known from the prior art. The version proposed according to the invention can therefore be disposed especially advantageously on the high-pressure side upstream of the control chamber of a control piston that indirectly actuates the nozzle needle, or directly upstream of the control chamber. In an advantageous feature of the valve body of the 3/2-way valve, this valve body includes a slide portion and a seat portion, whether the valve body of the 3/2-way valve is used in an arrangement as an inward-opening valve or in an arrangement as an outward-opening valve.

If the 3/2-way valve is used on a control piston by way of which the nozzle needle is controlled, and if this control piston is subjected to pressure, then the injection nozzle can also be put under pressure. By means of the 3/2-way valve, the control of the pressure can be done via the control piston. Both the valve body of the 3/2-way valve in the inward-opening valve version and the valve body of 3/2-way valves in the outward-opening valve version are provided with hydraulic faces configured such that a state of pressure equilibrium of the valve body is made possible. The state of pressure equilibrium of the valve body makes it possible to use only slight actuating forces; that is, the valve bodies configured according to the invention can be moved by means of a magnet valve, without the interposition of a pressure booster for increasing the stroke lengths. The valve bodies furthermore each include one seat portion and one longitudinal slide portion. By means of the seat portion of the valve bodies, the high-pressure side of the 3/2-way valve can be closed, so that no pressure losses occur.

The valve bodies have a low mass and therefore make the shortest possible switching times possible; the achievement of short switching times is further reinforced by the state of pressure equilibrium of the valve bodies. Particularly when the 3/2-way valve is used in the inward-opening valve arrangement, the opening motion of the valve needle is reinforced, since in this arrangement the valve body opens into the pressure chamber.

The structural form of the valve body, with a seat portion and a longitudinal slide portion, makes simple large-scale mass production of the valve body possible.

BRIEF DESCRIPTION OF THE DRAWINGS

The invention is described in further detail below in conjunction with the drawings, in which:

FIG. 3, the schematic hydraulic circuit diagram of the further variant embodiment of FIG. 2; and FIG. 4, the variant embodiment of a 3/2-way valve in an inward-opening valve arrangement, that is, moving into a pressure chamber.

DESCRIPTION OF THE PREFERRED EMBODIMENTS

Figure 1:
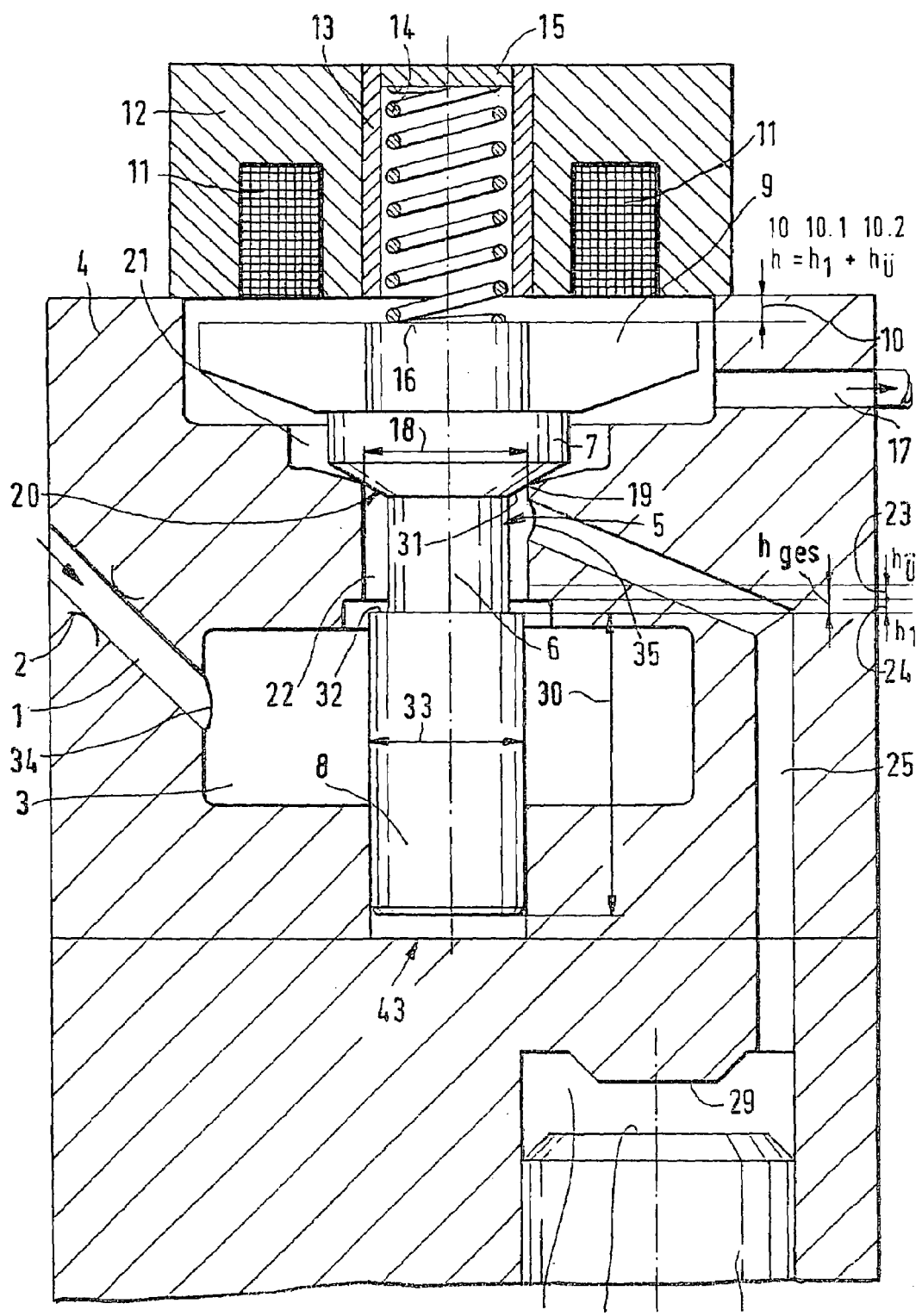
FIG. 1, shows a variant embodiment of a 3/2-way valve in an outward-opening valve arrangement, that is, moving out of a pressure chamber.

FIG. 1 shows a variant embodiment of a 3/2-way valve, which is embodied in an outward-opening valve arrangement and which actuates a control piston that acts upon the nozzle needle.

In the arrangement shown in FIG. 1, a control chamber 26, which acts with pressure upon a control piston 27, is pressure-relieved or acted upon by pressure by means of a 3/2-way valve 5. Via the indirect actuation of a nozzle needle via the control piston 27, a closure of the nozzle needle can also be accomplished under pressure, which can be desirable in injection events.

Via a high-pressure inlet 1, which discharges at a discharge point 34 into an annular chamber 3, the annular chamber is acted upon with pressure by fuel that is at high pressure from the high-pressure collection chamber (common rail), not shown, of an injection system. Instead of the common rail, the high-pressure inlet 1 can also be acted upon directly via a high-pressure pump. The high-pressure inlet 1 can be provided with an inlet throttle 2—as schematically indicated in FIG. 1. The annular chamber 3 is embodied inside the housing 4 of an injector body.

The variant embodiment shown in FIG. 1 of a 3/2-way valve 5 includes a valve body 6, which has both a seat portion 7 and a longitudinal slide portion 8. The seat portion 7 is located above the longitudinal slide portion 8. Above the seat portion 7 in the valve body 6 an armature plate 9 is embodied on the valve body 6, forming the end face of the valve body 6. Above the armature plate 9 and spaced apart from it by a gap size 10 (h) is a coil housing 12, which receives an annularly configured magnet coil 11. The coil housing 12 further includes a sleevelike insert 13, which surrounds a compression spring 14. The compression spring is braced on the upper end of the coil housing 12 by an adjustment disk 15, which is let into the interior of the sleevelike body 13. The other end of the compression spring 14, preferably embodied as a spiral spring, is braced on a contact face 16 of the armature plate 9, which is spaced apart by the gap size 10 (h) from the face end of the magnet coil 11 in the coil housing 12. The gap size 10 is composed of one component 10.1 ($h_1$) and a second component ($h_0$), identified by reference numeral 10.2; $h_{RL}$ designates that component of the gap size 10 that results from the requisite remanent air gap. While $h_1$ designates the prestroke until the control edges are at the same level and a sealing action results, the second component $h_0$ represents the amount of overlap. The total stroke is composed of both components $h_1$ and $h_0$.

The seat portion 7 of the valve body 6 in the variant embodiment of the 3/2-way valve 5 is surrounded inside the housing 4 by a recess 21 of cuplike configuration. Above the cuplike recess 21, a low-pressure outlet 17, oriented laterally from the armature plate 9, branches off, and through it, a diverted fuel volume flows out into the low-pressure region of the fuel injection system, such as the vehicle tank. The seat portion 7 of the valve body 6, has a seat diameter 18 which cooperates with a seat face 19, embodied in the housing 4, of a valve seat 20. By means of the seat portion 7, an annular chamber 22 can be sealed off below the seat portion 7, so that no pressure losses on the high-pressure side can occur in the low-pressure region 17 of the 3/2-way valve 5. The annular chamber 22 extends inside the housing 4 of the 3/2-way valve 5 from the seat portion 7 as far as a control edge for the longitudinal slide portion 8. The longitudinal slide portion 8 in includes a slide portion length 30, having diameter equivalent to the seat diameter 18 in the lower region of the seat portion 7 of the valve body 6. The hydraulic faces 31 and 32 that define the annular chamber 22 inside the housing 4 of the 3/2-way valve 5 are identical in terms of their hydraulic areas, so that the valve body 6 of the 3/2-way valve is pressure-balanced. A control chamber line 25 also branches off from the annular chamber 22 inside the housing 4; in the view of the variant embodiment shown in FIG. 1, it is embodied without a throttle restriction. The control chamber line 25 discharges into the control chamber 26 at a control chamber wall 29. The control chamber 26, which is likewise embodied in the housing 4, encloses an upper face end 28 of a control piston 27, with which a nozzle needle, not shown here, is indirectly actuatable.

The annular chamber 3 embodied in the housing 4 encloses the longitudinal slide portion 8 of the valve body 6, and a recess is let into the upper region of the annular chamber 3. The hydraulic face 32 that forms the slidelike control edge plunges into this recess when the magnet coil 11 is triggered. The total stroke of the valve body 6, composed of the portions $h_1$ and $h_0$, is traversed as fast as possible. Supplying electric current to the magnet coil 11 attracts the armature plate 9, and the valve body 6 is moved upward. The first gap size 10.1, corresponding to an opening stroke length $h_1$ (reference numeral 24) is spanned upon excitation of the magnet coil 11, so that the seat portion 7 moves out of its valve seat 20, and pressure from the control chamber 26 escapes into the low-pressure line 17. The outflow quantity can optionally be limited by a throttle, not shown here. In the further stroke of the armature plate 9 of the valve body 6 corresponding to a second portion of the gap size 10.2, that is, corresponding to the stroke length $h_0$ (see reference number 23, overlapping stroke $h_0$), the control chamber, embodied in the housing 4, overlaps with the control chamber of the hydraulic face 32 embodied in the upper portion of the longitudinal slide portion 8. Depending on the overlap 23 $h_0$ set, the high pressure, which prevails in the annular chamber 3 from the high-pressure source via the high-pressure inlet 1, is completely closed off. Any leak from the high-pressure inlet that occurs has no influence on the behavior of the control chamber, since the opened cross section of the seat portion 7 in the upper region of the valve body 6 of the 3/2-way valve 5 is very large by comparison.

When the magnet coil 11 is switched off by a control unit, not shown in FIG. 1, the restoration of the valve body 6 into the zero position occurs. This is attained by means of the restoring spring 14, which acts upon the stop face 16 embodied on the armature plate 9 and restores the valve body 6 again in the variant embodiment of the 3/2-way valve 5 of FIG. 1.

The variant embodiment shown in FIG. 1 of the 3/2-way valve 5 is selected in an outward-opening valve arrangement 43, in which the valve body 6 opens, moving outward from the pressure chamber, in this case the annular chamber 3. The variant embodiment shown in FIG. 1 of the 3/2-way valve 5 is pressure-balanced in the switching positions; that is, the hydraulic faces 31 and 32 on the valve body 6 that are operative and are exposed to the pressure, and the resultant forces, cancel one another out in their action, so that by the use of electromagnets containing magnet coils 11, fast, short switching times are attainable, given adequate strokes.

Figure 2:
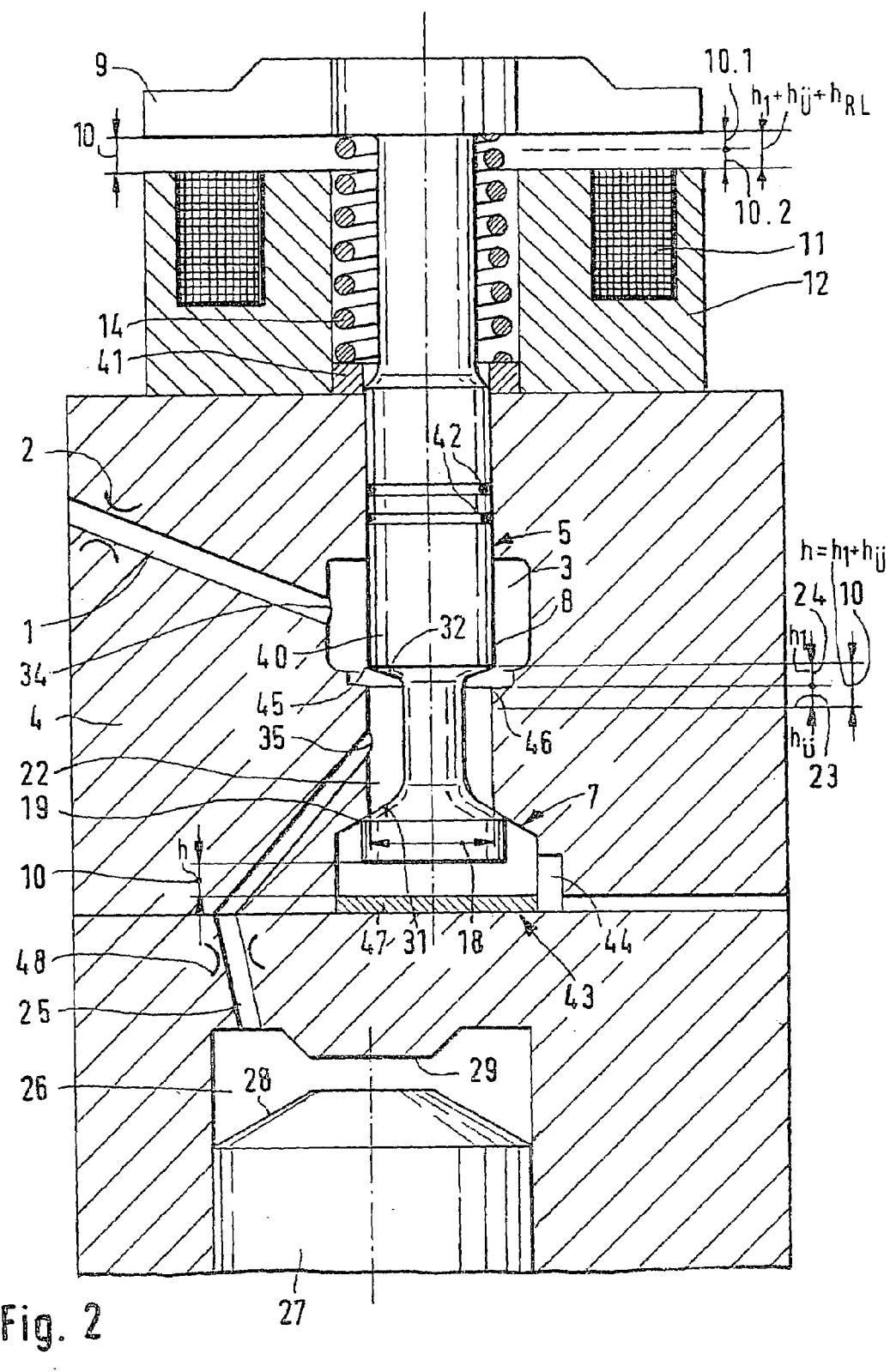
FIG. 2, a further variant embodiment of a 3/2-way valve in an outward-opening valve arrangement.

FIG. 2 shows a further variant embodiment of a 3/2-way valve, again in an outward-opening valve arrangement.

In the variant embodiment shown in FIG. 2 of a 3/2-way valve 5, the seat portion 7 and the longitudinal slide portion 8 on the valve body 40 are transposed—compared to the illustration in FIG. 1.

In the further variant embodiment in FIG. 2. the high-pressure inlet 1 discharges in the annular chamber 3 of the housing 4. The annular chamber 3 is adjoined inside the housing 4 by the annular chamber 22. From the annular chamber 22, a control chamber line 25 branches off at a discharge point 35; this line can optionally include a throttle restriction 48. The control chamber line 25 discharges within the control chamber wall 29 into the control chamber 26, which is partly bounded by the end face 28 of the control piston 27.

In the further variant embodiment of FIG. 2, the coil housing 12 with the magnet coil 11 let into it is located in operation above the annular chamber 3. Analogously to the variant embodiment of FIG. 1, a gap size 10, which includes a first gap size portion 10.1 and a second gap size portion 10.2 (analogously to the variant embodiment of FIG. 1), is established between an armature plate 9, communicating with the valve body 40, and the face end toward the armature plate of the magnet coil 11; $h_{RL}$ designates the remanent air gap. A tapered region of the valve body 40 is surrounded by a compression spring 14, which is braced by one end on a part of the valve body 40 that receives the armature plate 9, while the other end of the restoring spring 14 rests on a spring prestressing force adjusting disk 41 that is inserted into a central bore of the magnet coil housing 12.

To stabilize the central position of the valve body 40, one or more grooves are embodied between the spring prestressing force adjusting disk 41 and the annular chamber 3, on the circumferential surface of the valve body 40.

Analogously to the view of the variant embodiment of FIG. 1, in the variant embodiment of the 3/2-way valve 5 in FIG. 2, the annular chamber 3 in the housing 4 is essentially penetrated by the longitudinal slide portion 8, on which a conically configured hydraulic face 32 is embodied that moves into a bore inside the housing. This hydraulic face 32 of the longitudinal slide portion 8 is located opposite a seat portion 7 on the lower end of the valve body 40, and this seat portion in turn includes a hydraulic face 31. By means of the seat portion 7, the valve seat 20 is closed in accordance with the stroke of the valve body 40 inside the housing 4 that is adjusted by the magnet coil 11, so that an outflow of high pressure via the annular chamber 22 into a leak fuel outlet 44 is precluded. A platelike insert 47 is shown below the face end of the seat portion 7; it prevents the maximum stroke, that is, a vertical stroke motion of the valve body 40 inside the housing 4 that exceeds the gap size 10.

Depending on the excitation of the magnet coil 11, that is, on the intensity of the magnetic force, the valve body 40 moves into the bore inside the housing 4. In an inward motion corresponding to the first gap size portion 10.1, opening of the valve seat 20 in the seat portion 7 of the valve body 40 takes place, so that the control chamber 26 is relieved toward the leak fuel side. A downward motion of the valve body 40 of the 3/2-way valve 5 follows, in the further variant embodiment in FIG. 2, in the direction of the insert 47 that defines the maximum stroke. In a vertical downward motion corresponding to the second gap size portion 10.2, an overlap at an overlap stroke length 23 ($h_O$) occurs between the seat slide portion 8, or the hydraulic face 32 embodied on it, and a control edge 46 of the housing. The edge 45 of the hydraulic face 32 in the lower region of the seat slide portion 8 of the valve body 40 seals off the high-pressure inlet 1 and the annular chamber 3, from the annular chamber 22 inside the housing 4 upon an overlap of the control edge 46 of the housing corresponding to the overlapping stroke 23. If the magnet coil 11 in the coil housing 12 is switched off, the restoration of the valve body 40 follows because of the action of the restoring spring 14, which is let in between the armature plate 9 and the support disk 41 on the housing 4 and moves the seat portion 7, embodied in the lower region of the valve body 40, into its seat face 19 toward the housing. In this zero position of the 3/2-way valve 5, in the variant embodiment of FIG. 2, the leak fuel outlet 44 is closed.

The further embodiment, shown in FIG. 2, of a 3/2-way valve is also embodied as an outward-opening valve arrangement; that is, the valve body 40 opens from a pressure chamber, in the present case the annular chamber 3, inside the housing 4. To bring about a pressure equilibrium, the seat diameter 18 of the seat portion 7 of the valve body 40 and the diameter of the longitudinal slide portion 8 of the valve body 40 match one another.

FIG. 3 shows the schematically simplified hydraulic circuit diagram of the further variant embodiment of FIG. 2 as well as throttle restrictions that can optionally be provided.

In FIG. 3, the 3/2-way valve is shown as a schematic block circuit diagram. A throttle restriction 2 is optionally associated with the high-pressure inlet 1, and like the control chamber lead line 25 opposite it, a throttle restriction 48 that can optionally be provided can be integrated, with which during the pressure relief of the control chamber 26 into the low-pressure region 17, the outflowing fuel quantity can be limited. The control chamber line 25 discharges into the control chamber 26 at an upper boundary wall 29. The control chamber 26 is partly defined by the end face 28 of the control piston 27, or of a nozzle needle. In the embodiment of the control piston 27 as a piston preceding the nozzle needle, the nozzle can remain closed, or can be closed under pressure. The control of the pressure via the piston 27 is the task of the 3/2-way valve 5. In the view in FIG. 3, the low-pressure outlet 17 is also shown, by way of which a diversion quantity flowing out from the control chamber 26 flows back into a low-pressure region, shown here only schematically, of a motor vehicle, such as a fuel tank.

FIG. 4 shows the variant embodiment of a 3/2-way valve in an inward-opening valve arrangement, that is, a valve that moves into the pressure chamber.

In this variant embodiment of an inward-opening valve arrangement 50 of a 3/2-way valve 5, its seat portion 7 and its longitudinal slide portion 8 are located jointly in the lower end region of a valve body 51 of the 3/2-way valve 5. A magnet coil 11 that is surrounded by a coil housing 12 is received in the upper region of the valve body 51. An armature plate 9 of the valve body 51 is spaced apart from the lower face end of the magnet coil 11 by a gap size 10(h). The total stroke between the face end of the magnet coil 11 pointing toward the armature plate and the armature plate 9 itself is represented by the double arrow 10 and is composed of a first gap size 10.1 and a second gap size 10.2. The first gap size 10.1 corresponds to the opening stroke $h_1$, or be overlap 23, while the second gap size 10.2, also shown, corresponds to the stroke $h_O$.

In the middle region of the valve body 51 of the 3/2-way valve 5 in the inward-opening valve arrangement 50, hydraulic faces 31 and 32 face one another on either side of an annular chamber 22 inside the housing 4. Because the hydraulic faces 31 and 32 are embodied with an identical area, a state of pressure equilibrium of the valve body 51 of the 3/2-way valve 5 is attainable, making the tiniest adjusting forces and the shortest switching times possible.

In this variant embodiment, the relief of the control chamber 26 to the low pressure 17 via the control lead line 25 is initiated upon triggering of the electromagnet 11, acting as an actuator, by an opening stroke $h_1$ (reference numeral 24). In this state, the conical seat 52 in the lower region of the valve body 51 opens, while the high-pressure inlet is closed by upward motion of the hydraulic face 32 in the upper region of the longitudinal slide portion 8 of the valve body 51 into the annular chamber 22 the high-pressure inlet 1. The greater the amount of the overlap 24 $h_O$, the tighter is the closure of the valve chambers 3 against the prevailing high pressure. If upon excitation of the magnet coil lithe valve body 51 is opened in accordance with the opening stroke $h_1$ (reference numeral 24), then the seat diameter 18 of the conical seat 52 moves upward in the annular chamber 3, so that fuel is capable of flowing out from the control chamber 26 into the low-pressure region 17, via the control chamber line 25 and the annular chamber 3.

The inward-opening valve arrangement 50, shown in FIG. 4, of the 3/2-way valve 5 configured according to the invention moreover enables an opening into the pressure chamber, thus reinforcing the opening motions of valve needles or the control piston 27, which additionally shortens the switching times.

In both variants, that is, the outward-opening valve arrangement 43 and inward-opening valve arrangement 50, the valve bodies 6, 40, 51 in the various switching positions of the 3/2-way valve 5 are pressure-balanced. The respective faces 31, 32 exposed to the pressure and the resultant adjusting forces cancel one another out in their effect. The actuation of the proposed 3/2-way valve 5 can be effected on the one hand by an actuator, which is embodied as a magnet coil 11, or on the other, it is quite possible to use further fast-switching actuators, such as piezoelectric actuators. In piezoelectric actuators, to assure an adequate stroke 10 to cover the opening stroke $h_1$ (24) and the overlapping stroke $h_0$ (reference numeral 23), a boost in terms of attaining the requisite stroke length must be assured, for instance in the form of a pressure booster or the like.

The 3/2-way valves 5 of the kind according to the invention can be used in injectors of the kind where the nozzle needle stroke is controlled, such as common rail injectors or unit fuel injectors.

The foregoing relates to preferred exemplary embodiments of the invention, it being understood that other variants and embodiments thereof are possible within the spirit and scope of the invention, the latter being defined by the appended claims.

The invention claimed is:

1. In a device for actuating a control piston or nozzle needle (27), via a control chamber (26), which communicates via a control chamber line (25) with valve chambers (3,22) of a 3/2-way valve (5), whose valve body (6, 40, 51) is switchable by means of an actuator (11) and is moreover acted upon by pressure by means of a restoring spring (14), and a seat portion (7) in the housing (4) embodied on the valve body (6, 40, 51) is put into its valve seat (20), the improvement wherein the valve body (6, 40, 51) of the 3/2-way valve (5) comprises a seat portion (7), a longitudinal slide portion (8), and opposing faces (31, 32) on the valve body which make the state of pressure equilibrium of the valve body (6, 40, 51) possible, the actuator (11) being operable to move the valve body (6, 40, 51), different stroke lengths (10.1, 10.2; 23, 24).

2. The device of claim 1, wherein the 3/2-way valve (5) is disposed upstream of the control chamber (26) relative to the high-pressure inlet (1).

3. The device of claim 1, wherein the 3/2-way valve (5) is built in in an outward-opening valve arrangement (43) in the housing (4).

4. The device of claim 3, wherein the seat portion (7) and the longitudinal slide portion (8) are opposite one another on the valve body (6).

5. The device of claim 1, wherein the 3/2-way valve (5) is received in the housing (4) in an inward-opening valve arrangement (50).

6. The device of claim 5, wherein the seat portion (7) and the longitudinal slide portion (8) are embodied jointly in the lower region of the valve body (51).

7. The device of claim 6, further comprising a seat face (19), which cooperates with a conical seat (52) inside the housing (4), embodied on the seat portion (7) of the valve body (51).

8. The device of claim 5, wherein within a first stroke length $h_1$ (24) of the valve body (6, 40, 51), the control chamber (26) is relieved on the low-pressure side.

9. The device of claim 8, wherein within a second stroke length $h_0$ (23), the high-pressure line (1) is disconnected from the valve chambers (3,22) of the 3/2-way valve (5).

10. The device of claim 8, further comprising a throttle element (48) received in the control chamber line (25) whereby during the pressure relief of the control chamber (26), the outflowing quantity is limitable within the stroke length $h_1$ (24).

11. The device of claim 1, wherein the longitudinal slide portion (8) hydraulically disconnects an annular chamber (3) from an annular chamber (22).

* * * * *